US006369618B1

(12) United States Patent
Bloodworth et al.

(10) Patent No.: US 6,369,618 B1
(45) Date of Patent: Apr. 9, 2002

(54) TEMPERATURE AND PROCESS INDEPENDENT EXPONENTIAL VOLTAGE-TO-CURRENT CONVERTER CIRCUIT

(75) Inventors: Bryan E. Bloodworth, Irving; Davy H. Choi, Garland; Mehedi Hassan, Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/490,652

(22) Filed: Jan. 24, 2000

Related U.S. Application Data

(60) Provisional application No. 60/119,731, filed on Feb. 12, 1999.

(51) Int. Cl.[7] ............................................. H02M 11/00

(52) U.S. Cl. ........................ 327/103; 327/346; 330/256

(58) Field of Search ................................ 327/103, 346, 327/358, 359, 362, 363, 560, 563; 330/254, 256, 260, 278, 289

(56) References Cited

U.S. PATENT DOCUMENTS

| | | | | | |
|---|---|---|---|---|---|
| 4,675,594 | A | * | 6/1987 | Reinke | 323/317 |
| 4,978,924 | A | * | 12/1990 | Schuster | 330/254 |
| 5,030,924 | A | * | 7/1991 | Fritz | 330/256 |
| 5,162,678 | A | * | 11/1992 | Yamasaki | 327/331 |
| 5,200,655 | A | * | 4/1993 | Feldt | 327/346 |
| 5,352,944 | A | * | 10/1994 | Sacchi et al. | 327/103 |
| 5,471,173 | A | * | 11/1995 | Moore et al. | 330/256 |
| 5,510,738 | A | * | 4/1996 | Gorecki et al. | 327/103 |
| 5,552,729 | A | * | 9/1996 | Deguchi | 327/103 |
| 5,610,547 | A | * | 3/1997 | Koyama et al. | 327/350 |
| 6,020,786 | A | * | 2/2000 | Ashby | 330/256 |

* cited by examiner

*Primary Examiner*—Timothy P. Callahan
*Assistant Examiner*—Hai L. Nguyen
(74) *Attorney, Agent, or Firm*—April M. Mosby; W. James Brady; Frederick J. Telecky, Jr.

(57) ABSTRACT

A voltage to current conversion circuit is described. The circuit comprises a first differential amplifier for receiving an input voltage and producing an output voltage, and a second amplifier for converting the output voltage of the first amplifier to a current. The transfer function of the voltage to current conversion circuit is proportional to an exponential function that depends on the input voltage. The circuit is temperature and process independent. In a first preferred embodiment, the first amplifier comprises a first transistor for receiving an input voltage at its base terminal, a temperature dependent current source coupled to the emitter of the first transistor, and a positive voltage supply coupled to the collector through a diode coupled transistor, and a second transistor paired with the first transistor and having a base terminal coupled to an input voltage terminal, an emitter coupled to a temperature dependent current source, and a collector coupled to a voltage supply. The output voltage is a differential signal taken from the collector terminals to the second amplifier, which comprises a third transistor coupled to a fixed current source, the base terminal for receiving the voltage output of the first amplifier, and an emitter coupled to a fourth transistor's emitter, the fourth transistor receiving the output voltage of the first stage at its base terminal, and the collector providing an output terminal. A feedback circuit is coupled to the emitters of the transistors of the third and fourth circuits and to the collector of a fifth transistor, the feedback circuit providing negative feedback to limit the current available at the output when the current through the feedback circuit exceeds a predetermined limit.

5 Claims, 2 Drawing Sheets

TEMPERATURE AND PROCESS INDEPENDENT EXPONENTIAL VOLTAGE-TO-CURRENT CONVERTER CIRCUIT

This application claims priority under 35 USC § 119 (e) (1) of Provisional Application No. 60/119,731, filed Feb. 12, 1999.

TECHNICAL FIELD OF THE INVENTION

This invention relates generally to automatic gain control (AGC) circuits and, more particularly, to automatic gain control circuits containing both a temperature compensation and an exponential control function for the loop's variable gain amplifier, and more specifically to the portion of the AGC circuit that provides the temperature compensation and the exponential transfer function.

BACKGROUND OF THE INVENTION

Optimal operation and cost effective electronic systems can best be achieved by designing those amplifiers to operate on approximately constant amplitude peak-to-peak signal input envelopes. This is often accomplished by using an automatic gain control circuit (AGC).

Automatic gain control circuits (AGCs) are used in a wide variety of electronic devices to control the amplitude of input information waveforms. The output of the AGC is bounded within a prescribed range, allowing subsequent electronic amplifier circuits to operate on those waveforms within, and only within, their designed limits of linearity thereby preserving the totality of the information content of those input waveforms. Example applications include hard disk drive systems, communication systems, sensor systems with a varying input signal; an example sensor system might be an electronic glucose monitor. These examples are illustrative only, many other applications for signal conditioning circuits using AGC's exist.

Without limiting the scope of this disclosure, in one application AGC's are used in the data channel circuits for hard disk drive storage products. Hard disk drive digital magnetic recording channels typically present varying input signal envelopes to post processing electronic circuitry. This occurs because of drive-to-drive variations, head-to-head variations, sector-to-sector variations, and variations within a sector caused by changes in the magnetic properties of the storage media used in the disk drive. It is easier and more cost effective to design post processing circuitry which accepts fixed level or controlled level inputs than to design elaborate circuitry which will accept wide variations in input signals. In the case of hard disk drive read circuitry, it is an AGC circuit in the first stage of the read signal circuitry that removes the envelope variations of the input signal, while preserving the information content, thereby passing a fixed amplitude signal to subsequent circuitry. This fixed amplitude signal facilitates the design of simple, low cost, and efficient post-processing circuitry in the subsequent stages.

The basic form of an AGC loop, as shown in FIG. 1, consists of an alternating current (a.c.) coupled input (1) followed by a variable gain amplifier (VGA) (3) which drives a low pass filter (5) followed by an a.c. coupled output (7) to subsequent circuitry, with a feedback loop from the output (7) of the low pass filter through a peak detector (9) to an exponential voltage-to-current converter (11). Converter (11) that provides as output a control signal that controls the gain of the VGA (3).

In operation, the AGC feedback loop responds rapidly to the input signal because of the exponential characteristic of the transfer function within the voltage-to-current converter (11). This exponential characteristic equalizes the AGC performance. An ideal voltage to current converter circuit in an AGC loop provides a transfer function that is expressed as: output=$e^x$, where x is a quantity proportional to an input signal. Usually the input will be a voltage from a peak detector circuit, but in other applications the input can take other forms. When the transfer function is ideal, the voltage-to-current converter provides a constant settling time for the feedback loop of the AGC for a variety of initial input signal conditions, which is very desirable. A well designed converter circuit for an AGC will provide a desired constant settling time independent of temperature and independent of process variations in the wafer process used to fabricate the circuitry.

In the prior art, exponential voltage-to-current converters have been designed exclusively for each wafer manufacturing process. These circuits have been complicated because of the need to provide temperature compensation. Without temperature compensation, the circuit performance will vary widely over a range of operating conditions, which results in unacceptable AGC performance.

Various approaches have been used to provide temperature compensation circuits for the exponential part of the AGC transfer function. Some prior art approaches provide for additional circuitry, which uses a PTAT (Proportional-To-Absolute-Temperature) current source, in the control path for driving the bases of a pair of differential transistors. The circuit is designed so that the temperature dependent terms in the numerator and denominator cancel each other out, making the entire circuit temperature independent for the prescribed ranges of operation. The gain function for the typical prior art AGC circuit is a hyperbolic function, which is approximately:

$$\frac{output}{input} = \frac{e^x}{1+e^x};$$

with x being a value which is which is approximately exponential for the range within the boundaries of the −x, −y quadrant of the hyperbolic tangent function.

The gain is a hyperbolic transfer function, which approximates the desired exponential transfer function only for small values of the quantity x. Further, this gain transfer expression holds only if one of the current sources varies appropriately over temperature so that there is no temperature dependence. Thus the circuit requires a PTAT current source.

Although these prior art approaches can provide a converter circuit for an AGC that performs approximately like an ideal exponential circuit under certain conditions, neither of these patents provides a circuit for an AGC with an ideal transfer function. Further, prior art solutions often require a PTAT current source, or an offboard PTAT source from which the current can be derived.

A simple and efficient voltage to current converter circuit for use in AGC circuits, and other applications, is therefore desirable. The transfer function should be an exponential function that is temperature independent and process variation independent for good performance over a range of conditions.

SUMMARY OF THE INVENTION

In accordance with the principles of the present invention, there is disclosed herein an exponential voltage-to-current converter circuit. The circuit can be used in any application where an exponential transfer function is desired. When used within an AGC circuit a preferred embodiment of the circuit provides the necessary exponential transfer function independent of temperature and manufacturing process for the AGC control loop.

In accordance with a preferred embodiment of the present invention, the circuit is immune to process differences between manufacturing facilities and ambient temperature differences while providing the broadest linear range of VGA gain control possible for a given input signal, because of its ideal $e^x$ input-output characteristic.

The circuit of a preferred embodiment of the invention is a two stage circuit. A first differential amplifier is provided for receiving an input voltage and outputting a voltage, the differential amplifier optionally including internal feedback amplifiers for providing gain between the input terminals and the base terminals of the differential pair of transistors that make up the differential amplifier, the optional amplifiers providing improved temperature compensation. A second stage receives the output voltage and outputs a current that is related to the input voltage by a temperature independent exponential function which is proportional to the input voltage. The circuit includes a negative feedback loop for limiting the output current when the current through the feedback loop exceeds a predetermined limit.

The present invention provides significant benefits over the prior art, in that:

1) the circuit uses fewer devices in the implementation;

2) the transfer curve is a true exponential function as opposed to using one quadrant of a hyperbolic tangent as an approximation to an exponential, thereby providing more range of linearity and a broader input voltage range for the circuit over the prior art; and 3) the circuit uses the existing current sources of the device chip as opposed to PTAT current sources which require additional circuitry on or off-chip.

BRIEF DESCRIPTION OF THE DRAWINGS

The foregoing features of the present invention may be more fully understood from the following detailed description, read in conjunction with the accompanying drawings, wherein.

DETAILED DESCRIPTION OF THE EMBODIMENTS

Figure 1:
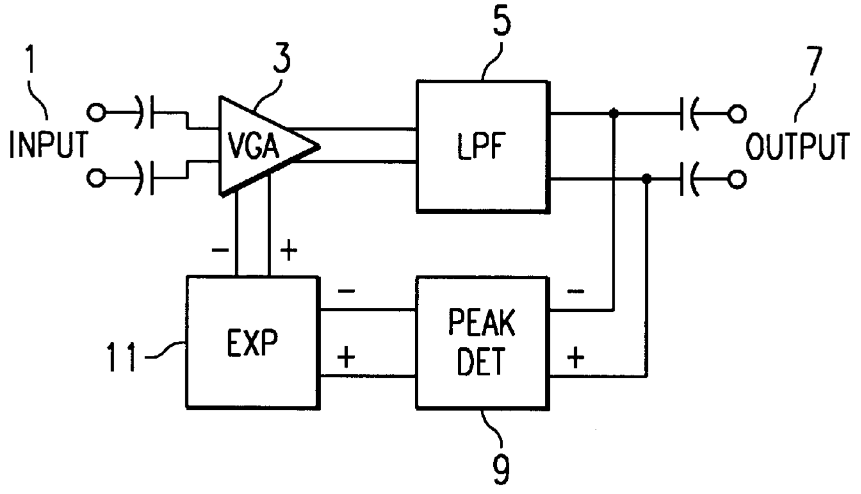
FIG. 1 is a block diagram of a typical AGC circuit.
Figure 2:
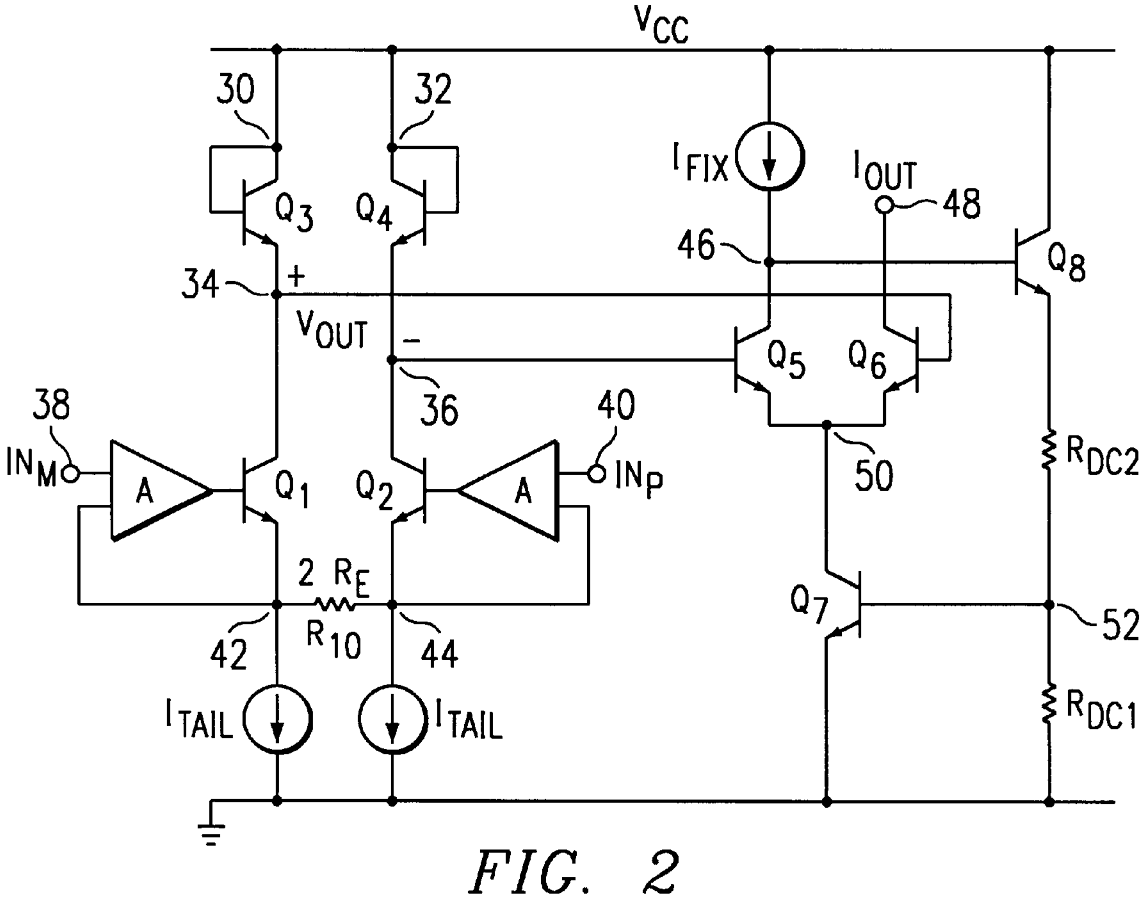
FIG. 2 is the temperature compensated exponential voltage-to-current converter circuit in accordance with the present invention.

The invention, as shown in a first preferred embodiment in FIG. 2, is a dual stage amplifier which converts variations of input voltages into temperature independent, exponentially varying output current. The output current of the circuit in FIG. 2 can be, but is not required to be, subsequently passed through a current mirroring devices (not shown) thereby providing a temperature independent, exponential voltage drive for subsequent electronic circuitry.

FIG. 2 is the circuit diagram of the present invention. Voltage inputs Inp and Inm receive an input signal for a differential pair. The differential pair comprises transistors Q1 and Q2 where the collector of transistor Q1 is coupled to positive supply voltage Vcc through the diode connected device Q3 and the collector of transistor Q2 is coupled to Vcc through diode connected device Q4. The emitter of each of the transistors in the transistor pair Q1/Q2 are connected to through current source Itail, and are separated from each other by resistor R10, which has value 2Re. The base terminals of transistors Q1 and Q1 are connected by way of amplifiers (A) to their respective emitters to establish a null in the Vbe junctions, thereby eliminating the final small variations in VbeQ1 and VbeQ2 from the transfer curve of the circuit These amplifiers (A) are not necessary to the operation of the circuit, but will improve temperature-compensating performance. (If the amplifiers are not desired in a given implementation, they may be eliminated and the voltage inputs INm and INp may be connected directly to the bases of Q1 and Q2, respectively, resulting in slightly degraded temperature compensation. Put another way, A=1 for cases where the amplifiers are not present.)

Node 34 is connected to the base of transistor Q6 and node 36 is connected to the base of transistor Q5. The collector of transistor Q5 is connected to Vcc through source current Ifix and the base of transistor Q8 at node 46 where it also draws current from current source Ifix. Typically Ifix is provided by a fixed current source, so this current Ifix does not vary with temperature or process variations in the integrated circuit which implements the circuit of FIG. 2. The emitter of transistor Q5 is connected to the collector of Q7 and the emitter of Q6 at node 50 forming the transistor pair Q5/Q6. The current from node 48 through the collector of transistor Q6 is the exponential current output (Iout) which will be interfaced to the subsequent circuitry that the voltage to current converter is driving. The emitters of transistor pair Q5/Q6 are connected to ground through transistor Q7. Transistor Q8, resistors Rdc1 and resistor Rdc2 provide the negative feedback to properly bias the current source circuitry for lout and clamp current Ifix.

Typically the circuitry of FIG. 2 will be implemented within an integrated circuit that provides for bipolar devices, such as a bipolar or biCMOS process as is known in the art. The resistors can be implemented in various ways, including polysilicon resistances or silicided polysilicon resistances.

The circuit of FIG. 2 is implemented in two stages, a first voltage comparison stage consisting of diode coupled transistors Q3 and Q4, differential pair Q1 and Q2, amplifiers A, resistor 2Re, and current sources Itail. This stage is a predistortion stage, which distorts the output in a manner designed to compensate for the following stage. The resistor 2Re is designed to degenerate the response in order to control the slope of the logarithmic transfer function.

The second stage consisting of transistors Q5 and Q6 and feedback circuitry consisting of transistor Q7, Q8 and resistors Rdc1 and Rdc2 performs the voltage to current conversion to produce current Iout. The current sourced by transistor Q7 must vary as the sum of currents Ifix and Iout. Therefore, the feedback circuit consisting of transistor Q7, resistors Rdc1 and Rdc2, and transistor Q8 efficiently allows the current through Q7 to increase and decrease as the input voltage increases and decreases, thereby establishing the exponential transfer function of the circuit. The current through transistor Q7 is the sum of Ifix and lout and is limited only by the allowable current density of Q7, the headroom of current source Ifix, and the circuit being driven by Iout.

Many modifications can be made to the circuit FIG. 2 while still embodying and gaining the advantages of the invention. For example, some CMOS transistors can be used in place of some of the bipolar transistors without departing from the invention. Transistors Q1 and Q2 in the first differential pair, and transistors Q7 and Q8, could be CMOS transistors. Current sources Itail and Ifix can be implemented in CMOS, bipolar or biCMOS technology.

Referring to FIG. 2, and solving for Vout in terms of Vin, where: (Vin=VInp−VInm), the difference voltage between the two input terminals. Then assuming the amplifiers A are in the circuit:

$$
\begin{aligned}
Vout1 &= \left(\frac{-A(qmQ1)}{1+(\mathrm{Re}\;qmQ1)}\right)\left(\frac{1}{qmQ3}\right)Vin \\
&= \left(\frac{-A(Vin)}{1+A(\mathrm{Re}\;qmQ1)}\right) \\
&= \frac{-A(Vin)}{1+(\mathrm{Re})\dfrac{Itail}{Vt}}
\end{aligned}
$$

Note: the transfer function without the amplifiers causes *A* in this equation to become = 1

Where *Vt* is the bipolar thermal voltage and *A* is the gain of the input buffer.

Therefore:

$$Vout = \frac{-Vin(Vt)}{\dfrac{Vt}{A}+(\mathrm{Re})(Itail)}$$

Solving for current Iout in terms of voltage Vout yields:

$$Iout = (Ifix)e^{\frac{-Vout}{Vt}}$$

Substituting Vout and simplifying, yields:

$$Iout=(Ifix)e^{(Vin/((Vt/A)+(Re)(Itail))}$$

Therefore Iout is an exponential function of Vin. If the voltage product Re * (Itail) is large compared to Vt divided by buffer gain A (Vt/A), and if Itail is made to vary with internal resistance (Re), then Iout will be independent of process and of temperature variations. Regardless of where the circuit is fabricated and regardless of fabrication run variations (process variations in the circuitry) the circuit may be used by the designer without regard to those fabrication places or variations in conditions at the time of device construction.

Note that the temperature dependent voltage value Vt/A may be reduced by increasing A, the gain of the buffers in FIG. 2. However, it has been found in practice that the voltage represented by the product of Re*Itail is often large enough to make the variations in Vt due to temperature dependence and process variations negligible. The designer may tailor gain A, resistance Re and current Itail to achieve a desired temperature independent exponential transfer function.

To understand the circuit feedback loop in FIG. 2 in operation, assume the voltage at terminal Inp increases. The voltage at the base of Q2 will increase, causing the voltage at node 34 to increase, and the base of transistor Q6 will increase. The current flowing through Q7 will increase, causing the voltage at node 52 to increase, this is reflected through the base-emitter junction of Q8 to node 46. As node 46 reaches a level near Vcc, the current source Ifix will be clamped and so will limit Iout. Thus the current Iout will be limited by the current supplied by current source Ifix as the voltage at node 46 approaches the positive supply voltage Vcc. The feedback circuit is negative in that as Iout increases, the amount of current available begins to decrease until it is clamped at a limit.

The feedback circuit further provides a limit on current Iout by taking current away from current source Ifix through the base current of transistor Q8 as the current Iout increases. Also, for the circuit to be properly biased, the current sourced through Q7 must increase and decrease as Iout increases and decreases and feedback transistor Q8 with resistors Rdc2 and Rdc1 accurately provide this variable tail current in an efficient manner.

Figure 3:
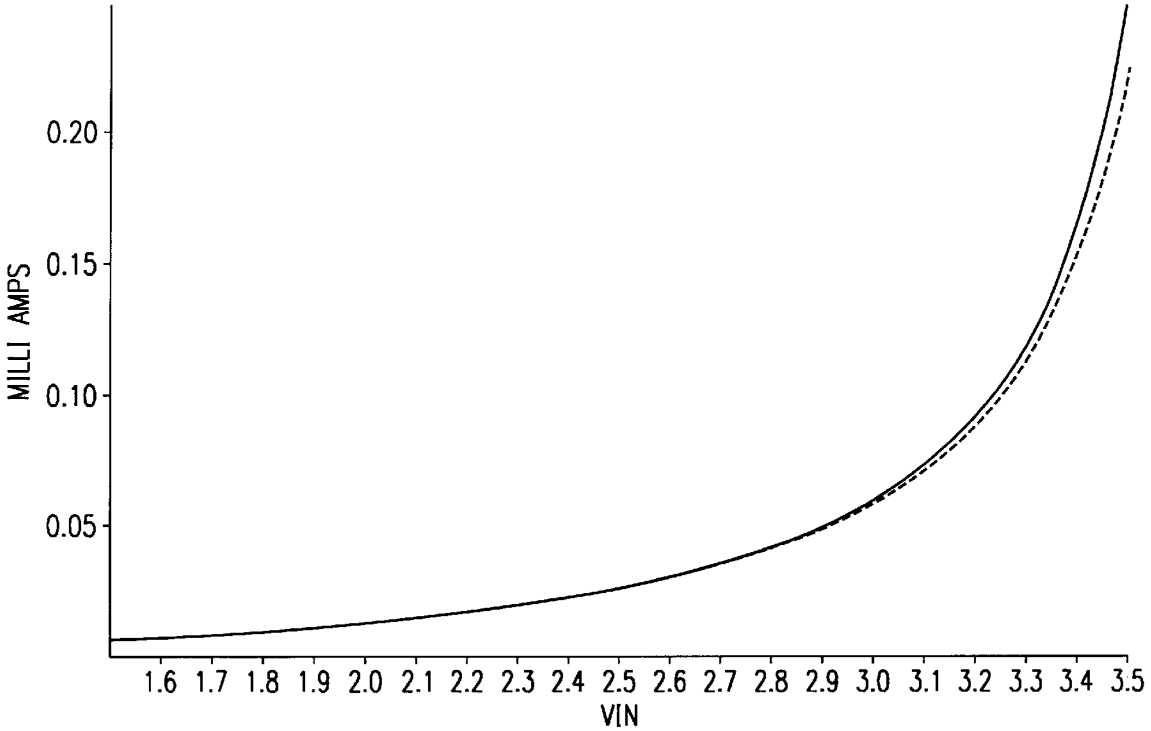
FIG. 3 is a curve of the (current out )-vs.-(voltage in) of the present invention.

FIG. 3 is a SPICE simulation of the present invention circuit that is shown in FIG. 2 comparing Iout to Vin for different process conditions and temperatures. It can be seen that the circuit has an exponential transfer characteristic that is largely independent of temperature and process variations, as intended.

Figure 4:
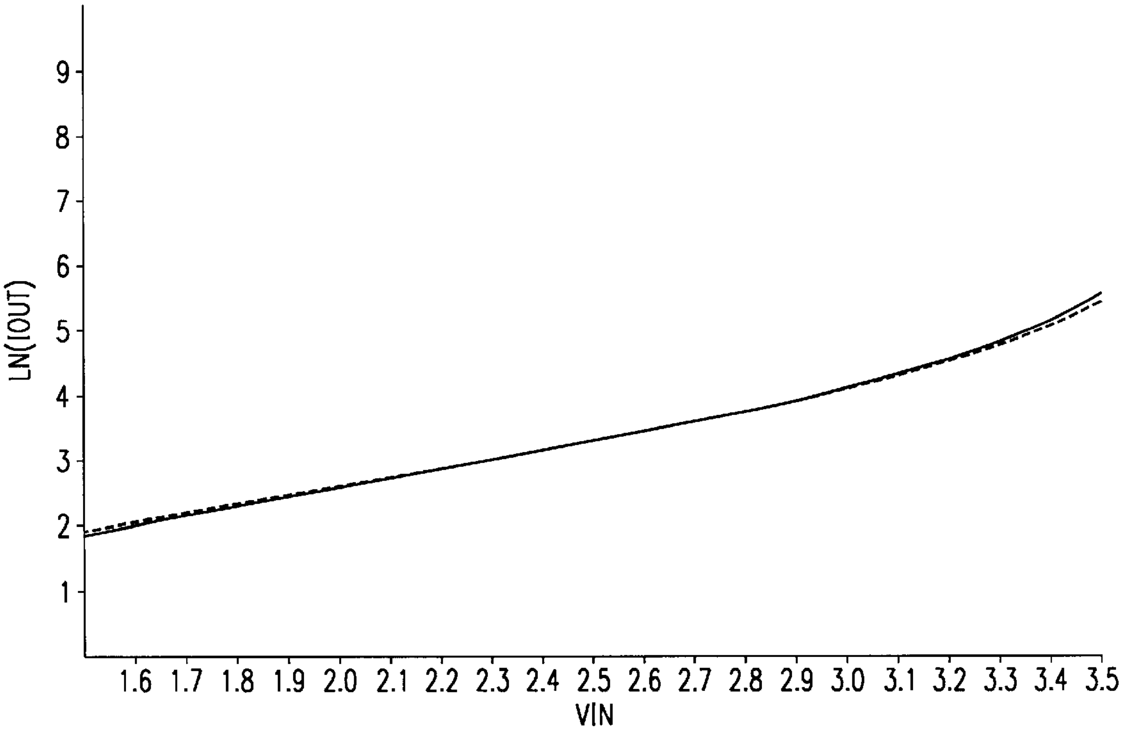
FIG. 4 is a SPICE generated curve of the (natural log of current out)-vs.-(voltage in) of the present invention illustrating the useful range of linearity between voltage values of 1.5 to 3.5.

Taking the natural log (Ln) of the curves of FIG. 3 provides the set of linear curves in FIG. 4. It should be noted that the linearity of the curves illustrated in FIG. 4 extends from input voltages less than 1.5 to approximately 3.5, above the typical operating voltages of integrated circuits for many applications.

As seen in the figure, the slope of the characteristic is linear and almost ideal. This linear characteristic proves Iout varies with Vin exponentially:

$$1\text{n } e^{(kx)}=kx$$

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims which follow.

What is claimed is:

1. A voltage-to-current converter circuit which provides an exponential output current, having a first and second voltage source, comprising:

a first and second differential input terminal;

a first differential amplifier stage having a first and second transistor coupled to the respective first and second differential input terminals to receive a respective first and second differential input voltage, said first differential amplifier having a first and second differential output terminal;

a third transistor having a collector, a base and an emitter, the collector coupled to a first current source, the base coupled to the second differential output voltage terminal;

a fourth transistor having a collector, a base and an emitter, the emitter coupled to the emitter of the third transistor, the base terminal coupled to the first differential output voltage terminal, the collector providing an output terminal for outputting a current; and a feedback circuit coupled to the third and fourth transistors and to the current source for clamping the current source to a predetermined limit;

whereby the output current provided by the fourth transistor is proportional to an exponential function of the first differential input voltage and independent of temperature.

2. The voltage-to-current converter circuit of claim 1, wherein said first amplifier stage further comprises:

the first transistor having a collector, a base and an emitter, the collector coupled to the first voltage source, the emitter coupled to a first temperature dependent current source, the base for controlling the current through the first transistor responsive to the first differential input voltage;

a second transistor having a collector, a base and an emitter, the collector coupled to the first voltage source and the emitter coupled to a second temperature dependent current source, the base for controlling the current through the second transistor responsive to the second differential input voltage; and a degeneration impedance coupling the emitters of the first and second transistors.

3. The circuitry of claim 2, wherein said first amplifier stage further comprises:

a first amplifier coupled between the first differential input voltage terminal and the base of said first transistor; and a second amplifier coupled between the second differential input voltage terminal and the base of said second transistor.

4. The voltage-to-current converter circuit of claim 1, wherein said feedback circuitry comprises:

a fifth transistor having a collector, a base and an emitter, the emitter coupled to the second voltage source, the collector coupled to the emitters of said third and fourth transistors, for sourcing the current through said third and fourth transistor responsive to the base; and a sixth transistor having a collector, a base and an emitter, the collector coupled to the first voltage source, the base coupled to the collector of the third transistor, for sinking current from the fixed current source responsive to the voltage at the collector of the third transistor.

5. An automatic gain control circuit comprising:

a variable gain amplifier for receiving a time varying input signal, and for outputting an output signal, the amplitude of the output signal varying in response to a control signal;

a low pass filter for receiving said output and for driving a circuit output terminal;

a peak detector circuit coupled to said circuit output terminal for outputting a voltage indicating when the output signal is outside a predetermined range;

an exponential voltage-to-current converter circuit for receiving the output of said peak detector circuit as an input, and having an output for driving the control circuitry of said variable gain amplifier to provide a feedback loop from said output;

whereby exponential transfer function of the voltage-to-current converter circuit providing a linear characteristic output to control the variable gain amplifier such that the automatic gain control circuit has approximately constant settling time independent of temperature;

said voltage-to-current converter circuit comprises:

a first and second differential input terminal;

a first differential amplifier stage having a first and second transistor coupled to the respective first and second differential input terminals for receiving a respective first and second differential input voltage, the first differential amplifier having a first and second differential output terminal;

a third transistor having a collector, a base and an emitter, the collector coupled to a first current source, the base coupled to the second differential output voltage terminal;

a fourth transistor having a collector, a base and an emitter, the emitter coupled to the emitter of the third transistor, the base terminal coupled to the first differential output voltage, the collector providing an output terminal for outputting a current; and a feedback circuit coupled to the third and fourth transistors and to the current source, for clamping the current source to a predetermined limit;

whereby the output current provided by the fourth transistor is proportional to an exponential function of the first differential input voltage and independent of temperature.

* * * * *